US012091643B2

(12) United States Patent
Huang et al.

(10) Patent No.: US 12,091,643 B2
(45) Date of Patent: Sep. 17, 2024

(54) PROCESS OF REMOVING MICROORGANISM FROM AN ARTICLE OF CLOTHING

(71) Applicant: The Procter & Gamble Company, Cincinnati, OH (US)

(72) Inventors: Haiyan Huang, Beijing (CN); Ryohei Ohtani, Nishinomiya (JP); Yijia Cao, Beijing (CN); Yuxiang Liu, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 307 days.

(21) Appl. No.: 17/520,935

(22) Filed: Nov. 8, 2021

(65) Prior Publication Data

US 2022/0195349 A1 Jun. 23, 2022

(30) Foreign Application Priority Data

Dec. 23, 2020 (WO) ................ PCT/CN2020/138571
Nov. 5, 2021 (WO) ................ PCT/CN2021/128994

(51) Int. Cl.

| | |
|---|---|
| ***C11D 3/48*** | (2006.01) |
| ***C11D 1/22*** | (2006.01) |
| ***C11D 1/72*** | (2006.01) |
| ***C11D 1/75*** | (2006.01) |
| ***C11D 1/831*** | (2006.01) |
| ***C11D 3/00*** | (2006.01) |
| ***C11D 3/20*** | (2006.01) |
| ***C11D 3/37*** | (2006.01) |
| ***C11D 17/00*** | (2006.01) |

(52) U.S. Cl.

CPC .................. *C11D 3/48* (2013.01); *C11D 1/22* (2013.01); *C11D 1/72* (2013.01); *C11D 1/75* (2013.01); *C11D 1/831* (2013.01); *C11D 3/0047* (2013.01); *C11D 3/2068* (2013.01); *C11D 3/2082* (2013.01); *C11D 3/2086* (2013.01); *C11D 3/3723* (2013.01); *C11D 17/0008* (2013.01); *C11D 2111/12* (2024.01)

(58) Field of Classification Search

None
See application file for complete search history.

(56) References Cited

U.S. PATENT DOCUMENTS

| | | | |
|---|---|---|---|
| 4,954,281 | A | 9/1990 | Resch |
| 5,861,371 | A | 1/1999 | Wilsch-irrgang et al. |
| 5,968,539 | A | 10/1999 | Beerse et al. |
| 6,106,851 | A | 8/2000 | Beerse et al. |
| 6,165,959 | A | 12/2000 | Meyer et al. |
| 6,451,333 | B1 | 9/2002 | Beerse et al. |
| 6,531,434 | B1 | 3/2003 | Gluck |
| 6,617,296 | B1 | 9/2003 | Connors et al. |
| 7,026,278 | B2 | 4/2006 | Price et al. |
| 2005/0215461 | A1 | 9/2005 | Gluck et al. |
| 2006/0035808 | A1 | 2/2006 | Ahmed et al. |
| 2006/0111261 | A1 | 5/2006 | Sadlowski |
| 2009/0226541 | A1 | 9/2009 | Scholz |
| 2014/0296349 | A1 | 10/2014 | Both |
| 2014/0352723 | A1 | 12/2014 | Cermenati et al. |
| 2015/0322385 | A1 | 11/2015 | Ohtani et al. |
| 2015/0322386 | A1 | 11/2015 | Ohtani et al. |
| 2015/0322387 | A1 | 11/2015 | Ohtani et al. |
| 2015/0376550 | A1 * | 12/2015 | Ohtani .................. C11D 3/505 510/319 |
| 2015/0376556 | A1 | 12/2015 | Ohtani |
| 2016/0060582 | A1 | 3/2016 | Ohtani et al. |
| 2016/0319227 | A1 | 11/2016 | Lant et al. |
| 2017/0009191 | A1 | 1/2017 | Maes |
| 2019/0270064 | A1 | 9/2019 | Postma |
| 2019/0390141 | A1 | 12/2019 | Li et al. |
| 2020/0199503 | A1 | 6/2020 | Piorkowski et al. |
| 2020/0221694 | A1 | 7/2020 | Purschwitz et al. |
| 2020/0299622 | A1 | 9/2020 | Sivik et al. |
| 2022/0112449 | A1 | 4/2022 | Mac Namara et al. |

FOREIGN PATENT DOCUMENTS

| | | | |
|---|---|---|---|
| CN | 1786134 | A | 6/2006 |
| CN | 101029280 | A | 9/2007 |
| CN | 102051277 | A | 5/2011 |
| CN | 102604763 | A | 7/2012 |
| CN | 109234089 | A | 1/2019 |
| CN | 111315858 | A | 6/2020 |
| JP | 2016102142 | A | 6/2016 |
| JP | 2018188641 | A | 11/2018 |
| JP | 2019104924 | A | 6/2019 |
| WO | 2013062127 | A1 | 5/2013 |

(Continued)

OTHER PUBLICATIONS

PCT Search Report and Written Opinion for PCT/CN2020/138571 dated Sep. 24, 2021, 12 pages.
PCT Search Report and Written Opinion for PCT/CN2021/128994 dated Mar. 2, 2022,11 pages.
All Office Actions; U.S. Appl. No. 17/517,707, filed Nov. 3, 2021.
All Office Actions; U.S. Appl. No. 17/528,223, filed Nov. 17, 2021.
U.S. Appl. No. 17/517,707, filed Nov. 3, 2021, to first inventor Fei Li et. al.
U.S. Appl. No. 17/528,223, filed Nov. 17, 2021, to first inventor Haiyan Huang et. al.

*Primary Examiner* — Lorna M Douyon

(74) *Attorney, Agent, or Firm* — Andrew J. Mueller

(57) ABSTRACT

A process of removing microorganism from an article of clothing is provided in which the process comprises the steps of a) providing an article of clothing in a washing machine; and b) contacting the article of clothing during a wash sub-cycle of the washing machine with a liquid detergent composition comprising a surfactant system and an organic acid, wherein the composition has a neat pH of from 1.5 to 5.0.

14 Claims, No Drawings

(56) References Cited

FOREIGN PATENT DOCUMENTS

| | | | |
|---|---|---|---|
| WO | 2013156371 | A1 | 10/2013 |
| WO | 2015083800 | A1 | 6/2015 |
| WO | 2015172678 | A1 | 11/2015 |
| WO | 2019071500 | A1 | 4/2019 |
| WO | 2019095089 | A1 | 5/2019 |
| WO | 2019107543 | A1 | 6/2019 |

* cited by examiner

PROCESS OF REMOVING MICROORGANISM FROM AN ARTICLE OF CLOTHING

FIELD OF THE INVENTION

The present invention relates to a process of removing microorganism from an article of clothing comprising the steps of a) providing an article of clothing in a washing machine; and b) contacting said article of clothing during a wash sub-cycle of said washing machine with a liquid detergent composition comprising a surfactant system and an organic acid, wherein the composition has a neat pH of from 1.5 to 5.0.

BACKGROUND OF THE INVENTION

Consumer products have evolved to address user needs for an anti-microbial benefit, in addition to their original intended functions. For example, an anti-microbial laundry detergent product is desired by users as it cleans fabrics whilst having an anti-microbial benefit on fabrics. Currently, various anti-microbial agents, e.g., bleaching agents, Chloroxylenol (PCMX), Benzalkonium Chloride (BKC), diphenyl ethers, are known for use in consumer product formulations to deliver an anti-microbial effect. Anti-microbial agents comprise two main types, in which one type functions as agents for removing microorganisms during the wash (e.g. bleaching agents, PCMX, BKC) and the other type functions as agents for preventing microorganisms during storage or use (e.g., diphenyl ethers).

However, in the context of liquid detergent products, it is still challenging to achieve a desired anti-microbial efficacy. Especially for the anti-microbial agents that functions as agents for removing microorganisms during the wash, there is still a need for applicable solutions because known actives cannot work in liquid detergent products due to negative interaction with surfactants (e.g., PCMX and BKC) or cannot be added into liquid detergent products (e.g., bleaching agents). Diphenyl ethers can be added into liquid detergent products. However, diphenyl ethers mainly function as a preventive means for the growth of microorganisms during the use of garments after they are deposited onto garments through the wash, but not effective in removing microorganisms which are already present on garments during the wash.

Thus, there is a continuing need for laundry detergent compositions that can deliver an effective benefit for removing microorganism from garments during the wash.

SUMMARY OF THE INVENTION

It is a surprising and unexpected discovery of the present invention that the combination of a surfactant system and an organic acid in a liquid detergent formulation can deliver an effective benefit for removing microorganism from garments. Particularly, the present invention provides a liquid detergent composition comprising from 4% to 60% by weight of the composition of a surfactant system and from 4.5% to 40% by weight of the composition of an organic acid, wherein the composition has a neat pH of from 1.5 to 5.0.

Correspondingly, the present invention in one aspect relates to a process of removing microorganism from an article of clothing comprising the steps of:

a) providing an article of clothing in a washing machine; and b) contacting said article of clothing during a wash sub-cycle of said washing machine with a liquid detergent composition comprising from 2% to 60% by weight of the composition of a surfactant system and from 4.5% to 40% by weight of the composition of an organic acid, wherein the composition has a neat pH of from 1.5 to 5.0.

Preferably, the composition may have a neat pH of from 1.6 to 4.5, preferably from 1.7 to 4.0, more preferably from 1.8 to 3.5, most preferably from 1.9 to 3.1. Surprisingly, when the neat pH of the liquid detergent composition in accordance with the present invention is within the preferred range, the efficacy of microbial may be further improved.

Preferably, the through-the-wash (TTW) pH during the wash sub-cycle may be from 2.5 to 6.0, preferably from 3.0 to 5.0, more preferably from 3.2 to 4.0, most preferably from 3.3 to 3.8.

Preferably, the composition may comprise from 5.5% to 30%, preferably from 6% to 20%, more preferably from 6.5% to 18%, by weight of the composition of the organic acid. Particularly, the organic acid may be a hydroxy carboxylic acid, preferably wherein the organic acid may be selected from the group consisting of citric acid, lactic acid, tartaric acid, malic acid and any combinations thereof.

Preferably, the composition comprises from 5% to 50%, preferably from 6% to 40%, more preferably from 10% to 30%, by weight of the composition of the surfactant system. Particularly, the surfactant system may comprise an anionic surfactant and a nonionic surfactant.

The anionic surfactant suitable for the composition in the present invention may be selected from the group consisting of C6-C20 linear alkylbenzene sulfonates (LAS), C6-C20 alkyl sulfates (AS), C6-C20 alkyl alkoxy sulfates (AAS), C6-C20 methyl ester sulfonates (MES), C6-C20 alkyl ether carboxylates (AEC), and any combinations thereof.

The nonionic surfactant suitable for the composition in the present invention may be selected from the group consisting of alkyl alkoxylated alcohols, alkyl alkoxylated phenols, alkyl polysaccharides, polyhydroxy fatty acid amides, alkoxylated fatty acid esters, sucrose esters, sorbitan esters and alkoxylated derivatives of sorbitan esters, and any combinations thereof.

The ratio of the anionic surfactant to the nonionic surfactant may be between 0.01 and 100, preferably between 0.05 and 20, more preferably between 0.1 and 10, and most preferably between 0.2 and 5, for example 0.1, 0.2, 0.3, 0.4, 0.5, 0.6, 0.7, 0.8, 0.9, 1, 1.1, 1.2, 1.3, 1.4, 1.5, 2, 3, 4, 5 or any ranges therebetween. In some preferred embodiments, the ratio of the anionic surfactant to the nonionic surfactant may be between 0.2 and 1.5, preferably between 0.3 and 1.2.

In some embodiments, the composition may comprise from 1% to 35%, preferably from 3% to 30%, more preferably from 4% to 25%, most preferably from 5% to 20%, for example 5%, 6%, 7%, 8%, 9%, 10%, 15%, 20% or any ranges therebetween, by weight of the composition of the anionic surfactant comprising $C_6$-$C_{20}$ linear alkylbenzene sulfonates (LAS). In some preferred embodiments, the composition may comprise from 1% to 35%, preferably from 3% to 30%, more preferably from 4% to 25%, most preferably from 5% to 20%, for example 5%, 6%, 7%, 8%, 9%, 10%, 15%, 20% or any ranges therebetween, by weight of the composition of $C_6$-$C_{20}$ linear alkylbenzene sulfonates (LAS).

In some embodiments, the composition may comprise from 1% to 35%, preferably from 3% to 30%, more preferably from 5% to 25%, most preferably from 7% to 20%, for example 5%, 6%, 7%, 8%, 9%, 10%, 15%, 20% or any ranges therebetween, by weight of the composition of the nonionic surfactant comprising $C_6$-$C_{20}$ alkoxylated alcohol. In some preferred embodiments, the composition may comprise from 1% to 35%, preferably from 3% to 30%, more preferably from 5% to 25%, most preferably from 7% to 20%, for example 5%, 6%, 7%, 8%, 9%, 10%, 15%, 20% or any ranges therebetween, by weight of the composition of $C_6$-$C_{20}$ alkoxylated alcohol.

Particularly, the composition may further comprise from 0.01% to 1%, preferably from 0.02% to 0.5%, by weight of the composition, of an anti-microbial agent that is hydroxyl diphenyl ether of formula (I):

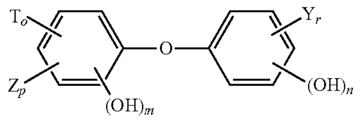

wherein:

each Y is independently selected from chlorine, bromine, or fluorine, each Z is independently selected from $SO_2H$, $NO_2$, or $C_1$-$C_4$ alkyl, r is 0, 1, 2, or 3, is 0, 1, 2, or 3, p is 0, 1, or 2, m is 1 or 2, and n is 0 or 1, wherein preferably said hydroxyl diphenyl ether is selected from the group consisting of 4-4'-dichloro-2-hydroxy diphenyl ether, 2,4,4'-trichloro-2'-hydroxy diphenyl ether, and a combination thereof, more preferably 4-4'-dichloro-2-hydroxy diphenyl ether.

Particularly, the composition may further comprise from 0.1% to 5%, preferably from 0.2% to 2%, by weight of the composition of an amphoteric surfactant that is preferably selected from the group consisting of C10-C16 alkyldimethyl amine oxides and combinations thereof, and wherein preferably said amphoteric surfactant is selected from the group consisting of dodecyldimethyl amine oxide, tetradecyldimethyl amino oxide, and a combination thereof.

Particularly, the composition may further comprise from 0.1% to 10%, preferably from 0.5% to 5%, by weight of the composition of a polyamine, preferably a polyethyleneimine, more preferably an alkoxylated polyethyleneimine.

In some particular embodiments of the present invention, the anionic surfactant may be present as the main surfactant, preferably as the majority surfactant, in the composition. Preferably, the ratio of anionic surfactant to nonionic surfactant may be between 1.05 and 100, preferably between 1.1 and 20, more preferably between 1.2 and 10, and most preferably between 1.3 and 5. Particularly, the anionic surfactant may comprise C6-C20 linear alkylbenzene sulfonates (LAS).

In some particular embodiments of the present invention, the nonionic surfactant may be present as the main surfactant, preferably as the majority surfactant, in the composition. Preferably, the ratio of anionic surfactant to nonionic surfactant may be between 0.01 and 0.95, preferably between 0.05 and 0.9, more preferably between 0.1 and 0.85, and most preferably between 0.2 and 0.8. Particularly, the nonionic surfactant may comprise C6-C20 alkoxylated alcohol.

In a particular embodiment of the present invention, the composition may comprise:

a) from 15% to 30% by weight of the composition of the surfactant system comprising an anionic surfactant and a nonionic surfactant with a weight ratio of the anionic surfactant to the nonionic surfactant is between 0.4 and 2.5 in which the anionic surfactant comprises C10-C16 linear alkylbenzene sulfonate and the nonionic surfactant comprises C12-C18 alkyl ethoxylate;

b) from 6.5% to 18% by weight of the composition of a citric acid; and c) from 0.02% to 0.5% by weight of the composition, of 4-4'-dichloro-2-hydroxy diphenyl ether, wherein the composition has a neat pH of from 1.9 to 3.1.

In another aspect, the present invention relates to a liquid detergent composition as mentioned hereinabove for the use of removing microorganisms from garments.

In another aspect, the present invention relates to a method of pretreating or treating a soiled fabric comprising contacting the soiled fabric with the liquid detergent composition as mentioned hereinabove.

In another aspect, the present invention relates to a process of removing biofilm on a biofilm-affected surface comprising contacting the biofilm-affected surface with the liquid detergent composition as mentioned hereinabove. Particularly, the biofilm-affected surface is in washing machines. More particularly, the biofilm-affected surface is an inner surface of a washing machine drum.

In another aspect, the present invention relates to a process of removing biofilm on a biofilm-affected surface comprising the steps of:

a) providing a biofilm-affected surface in a washing machine; and b) contacting said biofilm-affected surface with a liquid detergent composition comprising from 2% to 60% by weight of the composition of a surfactant system and from 4.5% to 40% by weight of the composition of an organic acid, wherein the composition has a neat pH of from 1.5 to 5.0.

In some embodiments, the process according to the present invention further comprises:

c) providing a rinse composition comprising from 10% to 40% by weight of the composition of an organic acid, wherein the rinse composition has a neat pH of from 1.5 to 4.0; and d) contacting said article of clothing during a rinse sub-cycle of said washing machine with said rinse composition.

Particularly, the rinse composition comprises 1) from 10% to 40%, preferably 15% to 30%, by weight of the composition of an organic acid which is preferably selected from the group consisting of citric acid, lactic acid, tartaric acid, malic acid, formic acid, acetic acid and any combinations thereof, 2) from 1% to 20%, preferably 2% to 10%, by weight of the composition of a solvent which is preferably selected from the group consisting of glycerol, ethylene glycol, diethylene glycol, propylene glycol, dipropylene glycol (DPG), sorbitol and mixtures thereof, wherein the rinse composition has a neat pH of from 1.5 to 4.0, preferably from 2.0 to 3.5, more preferably from 2.5 to 3.0.

More particularly, the rinse composition may further comprise:

3) from 0.1% to 10%, preferably 0.5% to 30%, by weight of the composition of a surfactant which is preferably selected from the group consisting of $_6$-$C_{20}$ linear alkylbenzene sulfonates (LAS), $C_6$-$C_{20}$ alkyl sulfates (AS), $C_6$-$C_{20}$ alkyl alkoxy sulfates (AAS), $C_6$-$C_{20}$ methyl ester sulfonates (MES), $C_6$-$C_{20}$ alkyl ether carboxylates (AEC), alkyl alkoxylated alcohols, alkyl alkoxylated phenols, alkyl polysaccharides, polyhydroxy fatty acid amides, alkoxylated fatty acid esters, sucrose esters, sorbitan esters and alkoxylated derivatives of sorbitan esters and any combinations thereof, and/or 4) from 0.1% to 20%, preferably 0.5% to 10%, by weight of the composition of a perfume.

It is an advantage of the liquid detergent composition according to the present disclosure that it may improve the microbial removal. Particularly, the liquid detergent composition according to the present disclosure may significantly remove microorganism from fabrics during the wash. In the context of the present disclosure, removing microorganism includes but not limited to kill, deactivate, eliminate and/or wash away microorganism.

DETAILED DESCRIPTION OF THE INVENTION

Definitions

As used herein, the articles including "a" and "an" when used in a claim, are understood to mean one or more of what is claimed or described.

As used herein, the terms "comprise", "comprises", "comprising", "include", "includes", "including", "contain", "contains", and "containing" are meant to be non-limiting, i.e., other steps and other ingredients which do not affect the end of result can be added. The above terms encompass the terms "consisting of" and "consisting essentially of".

As used herein, when a composition is "substantially free" of a specific ingredient, it is meant that the composition comprises less than a trace amount, alternatively less than 0.1%, alternatively less than 0.01%, alternatively less than 0.001%, by weight of the composition, of the specific ingredient.

As used herein, the term "laundry detergent composition" means a composition for cleaning soiled materials, including fabrics. Such compositions may be used as a pre-laundering treatment, a post-laundering treatment, or may be added during the rinse or wash cycle of the laundering operation. The laundry detergent composition compositions may have a form selected from liquid, powder, single-phase or multi-phase unit dose, pouch, tablet, gel, paste, bar, or flake. Preferably, the laundry detergent composition is a liquid. The term "liquid laundry detergent composition" herein refers to compositions that are in a form selected from the group consisting of pourable liquid, gel, cream, and combinations thereof. The liquid laundry detergent composition may be either aqueous or non-aqueous, and may be anisotropic, isotropic, or combinations thereof.

As used herein, the term "anti-microbial agent" refers to a chemical compound of which the principle intended function is to kill microorganism (e.g. bacteria, fungus, and/or virus) and/or to prevent their growth or reproduction. Traditional anti-microbial agents include cationic anti-microbial agents (e.g., certain ammonium chlorides), nonionic anti-microbial agents, etc. diphenyl ether compounds that are used in the present invention are nonionic anti-microbial agents.

As used herein, the term "microorganism" refers to any organism of microscopic or ultramicroscopic size, including but not limited to bacteria, fungus, protozoa and virus.

As used herein, the term "main surfactant" refers to a surfactant that is present in a composition at an amount that is greater than any other surfactant contained by such composition.

As used herein, the term "majority surfactant" refers to a surfactant that is present in a composition at an amount that is at least 50% by weight of the total surfactant content in such composition.

As used herein, the term "alkyl" means a hydrocarbyl moiety which is branched or unbranched, substituted or unsubstituted. Included in the term "alkyl" is the alkyl portion of acyl groups.

As used herein, the term "washing solution" refers to the typical amount of aqueous solution used for one cycle of laundry washing, preferably from 1 L to 50 L, alternatively from 1 L to 20 L for hand washing and from 20 L to 50 L for machine washing.

As used herein, the term "soiled fabric" is used non-specifically and may refer to any type of natural or artificial fibers, including natural, artificial, and synthetic fibers, such as, but not limited to, cotton, linen, wool, polyester, nylon, silk, acrylic, and the like, as well as various blends and combinations.

Liquid Detergent Composition

The liquid detergent composition of the present invention comprises a surfactant system and an organic acid, in which the composition has a neat pH of from 1.5 to 5.0, preferably from 1.6 to 4.5, more preferably from 1.7 to 4.0, most preferably from 1.8 to 3.6. Further, the liquid detergent composition of the present invention may preferably comprise an anti-microbial agent that is a diphenyl ether. It has been surprisingly found that, by combining a surfactant system with an organic acid achieved by an organic acid, an excellent efficacy of removing microorganisms can be achieved. Such effect is unexpected because either a similar surfactant system or an acid solution alone cannot deliver such efficacy.

Preferably, the composition may comprise from 5.5% to 30%, preferably from 6% to 20%, more preferably from 6.5% to 18%, by weight of the composition of the organic acid. Particularly, the organic acid may be a hydroxy carboxylic acid, preferably wherein the organic acid may be selected from the group consisting of citric acid, lactic acid, tartaric acid, malic acid and any combinations thereof.

In a laundry washing solution, the through-the-wash (TTW) pH during the wash sub-cycle may be preferably from 2.5 to 6.0, preferably from 3.0 to 5.0, more preferably from 3.2 to 4.0.

The composition may further an anti-microbial agent which is a hydroxyl diphenyl ether. Preferably, the anti-microbial agent may be selected from the group consisting of 4-4'-dichloro-2-hydroxy diphenyl ether, 2,4,4'-trichloro-2'-hydroxy diphenyl ether, and a combination thereof.

The laundry detergent composition herein provides efficacy for removing Gram positive bacteria (e.g., *Staphylococcus aureus*) and/or Gram negative bacteria (e.g., *E. coli*). In one embodiment, the laundry detergent composition provides a Microbial Removal Value of at least a log 1.0 reduction, preferably at least a log 1.5 reduction, more preferably at least a log 2.0 reduction, yet more preferably a log 2.5 reduction, yet more preferably a log 3.0 reduction, most preferably a log 3.5 reduction, against Gram positive bacteria and/or Gram negative bacteria, to treated fabrics versus non-treated fabrics.

Further, the composition may preferably provide an improved efficacy for microbial prevention to the fabrics treated by the composition. Without being bound by any theory, it is believed that the anti-microbial agent may more effectively deposit onto the fabrics during a washing cycle by using the liquid detergent composition according to the present invention and subsequently the deposited (i.e., residual) anti-microbial agent may more effectively prevent bacteria growth onto the fabrics during drying or storage or wear. In one embodiment, the laundry detergent composition provides a Bacteriostatic Activity Value of at least a log 1.0 reduction, preferably at least a log 1.5 reduction, more preferably at least a log 2.0 reduction, yet more preferably a log 2.5 reduction, against Gram positive bacteria and/or Gram negative bacteria, to treated fabrics versus non-treated fabrics. Preferably, the composition provides at least a log 1.0 reduction, preferably at least a log 1.5 reduction, more preferably at least a log 2.0 reduction, yet more preferably a log 2.5 reduction, against *E. coli, Staphylococcus aureus* and/or *Klebsiella pneumoniae* after a 10 minutes contact time in a 1055 ppm aqueous solution as determined by the JISL 1902 method (that is described below). More preferably, the composition provides at least a log 1.0 reduction, preferably at least a log 1.5 reduction, more preferably at least a log 2.0 reduction, yet more preferably at least a log 2.5 reduction, yet more preferably at least a log 3.0 reduction, most preferably a log 3.5 reduction, against *Staphylococcus aureus.*

The laundry detergent composition can have any suitable viscosity depending on factors such as formulated ingredients and purpose of the composition. In one embodiment, the composition has a high shear viscosity value, at a shear rate of 20/sec and a temperature of 21° C., of about 100 to about 3,000 cP, alternatively about 300 to about 2,000 cP, alternatively about 500 to about 1,000 cP, and a low shear viscosity value, at a shear rate of 1/sec and a temperature of 21° C., of about 500 to about 100,000 cP, alternatively about 1000 to about 10,000 cP, alternatively about 1,500 to about 5,000 cP.

Surfactant System

Preferably, the composition comprises from 4% to 50%, preferably from 6% to 40%, more preferably from 10% to 30%, by weight of the composition of the surfactant system. Particularly, the surfactant system may comprise an anionic surfactant and a nonionic surfactant.

The anionic surfactant suitable for the composition in the present invention may be selected from the group consisting of $C_6$-$C_{20}$ linear alkylbenzene sulfonates (LAS), $C_6$-$C_{20}$ alkyl sulfates (AS), $C_6$-$C_{20}$ alkyl alkoxy sulfates (AAS), $C_6$-$C_{20}$ methyl ester sulfonates (MES), $C_6$-$C_{20}$ alkyl ether carboxylates (AEC), and any combinations thereof. For example, the laundry detergent composition may contain a $C_6$-$C_{20}$ alkyl alkoxy sulfates ($AA_xS$), wherein x is about 1-30, preferably about 1-15, more preferably about 1-10, most preferably x is about 1-3. The alkyl chain in such $AA_xS$ can be either linear or branched, with mid-chain branched $AA_xS$ surfactants being particularly preferred. A preferred group of $AA_xS$ include $C_{12}$-$C_{14}$ alkyl alkoxy sulfates with x of about 1-3. In some embodiments, the composition comprises from 1% to 30%, preferably from 2% to 25%, more preferably from 3% to 20%, for example, 4%, 5%, 6%, 7%, 8%, 9%, 10%, 12%, 14%, 16%, 18%, 20%, or any ranges therebetween, by weight of the composition of the anionic surfactant.

The nonionic surfactant suitable for the composition in the present invention may be selected from the group consisting of alkyl alkoxylated alcohols, alkyl alkoxylated phenols, alkyl polysaccharides, polyhydroxy fatty acid amides, alkoxylated fatty acid esters, sucrose esters, sorbitan esters and alkoxylated derivatives of sorbitan esters, and any combinations thereof. Non-limiting examples of nonionic surfactants suitable for use herein include: $C_{12}$-$C_{18}$ alkyl ethoxylates, such as Neodol® nonionic surfactants available from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as Pluronic® available from BASF; $C_{14}$-$C_{22}$ mid-chain branched alkyl alkoxylates, BAEx, wherein x is from about 1 to about 30; alkylpolysaccharides, specifically alkylpolyglycosides; polyhydroxy fatty acid amides; and ether capped poly(oxyalkylated) alcohol surfactants. Also useful herein as nonionic surfactants are alkoxylated ester surfactants such as those having the formula $R^1C(O)O(R_2O)nR^3$ wherein $R^1$ is selected from linear and branched $C_6$-$C_{22}$ alkyl or alkylene moieties; $R^2$ is selected from $C_2H_4$ and $C_3H_6$ moieties and $R^3$ is selected from H, $CH_3$, $C_2H_5$ and $C_3H_7$ moieties; and n has a value between about 1 and about 20. Such alkoxylated ester surfactants include the fatty methyl ester ethoxylates (MEE) and are well-known in the art. In some particular embodiments, the alkoxylated nonionic surfactant contained by the laundry detergent composition of the present invention is a $C_6$-$C_{20}$ alkoxylated alcohol, preferably $C_8$-$C_{18}$ alkoxylated alcohol, more preferably $C_{10}$-$C_{16}$ alkoxylated alcohol. The $C_6$-$C_{20}$ alkoxylated alcohol is preferably an alkyl alkoxylated alcohol with an average degree of alkoxylation of from about 1 to about 50, preferably from about 3 to about 30, more preferably from about 5 to about 20, even more preferably from about 5 to about 9. In some embodiments, the composition comprises from 1% to 30%, preferably from 2% to 25%, more preferably from 3% to 20%, for example, 4%, 5%, 6%, 7%, 8%, 9%, 10%, 12%, 14%, 16%, 18%, 20%, or any ranges therebetween, by weight of the composition of the nonionic surfactant.

The ratio of anionic surfactant to nonionic surfactant may be between 0.01 and 100, preferably between 0.05 and 20, more preferably between 0.1 and 10, and most preferably between 0.2 and 5.

In some embodiments, the anionic surfactant comprises a $C_6$-$C_{20}$ linear alkylbenzene sulfonate surfactant (LAS), preferably $C_{10}$-$C_{16}$ LAS, and more preferably $C_{12}$-$C_{14}$ LAS.

In some particular embodiments of the present invention, the anionic surfactant may be present as the main surfactant, preferably as the majority surfactant, in the composition. Preferably, the ratio of anionic surfactant to nonionic surfactant may be between 1.05 and 100, preferably between 1.1 and 20, more preferably between 1.2 and 10, and most preferably between 1.3 and 5. Particularly, the anionic surfactant may comprise $C_6$-$C_{20}$ linear alkylbenzene sulfonates (LAS).

In some particular embodiments of the present invention, the nonionic surfactant may be present as the main surfactant, preferably as the majority surfactant, in the composition. Preferably, the ratio of anionic surfactant to nonionic surfactant may be between 0.01 and 0.95, preferably between 0.05 and 0.9, more preferably between 0.1 and 0.85, and most preferably between 0.2 and 0.8. Particularly, the nonionic surfactant may comprise $C_6$-$C_{20}$ alkoxylated alcohol.

The laundry detergent composition of the present invention may further comprise a cationic surfactant. Non-limiting examples of cationic surfactants include: quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride;

polyamine cationic surfactants; and amino surfactants, specifically amido propyldimethyl amine (APA).

The laundry detergent composition of the present invention may further comprise another amphoteric surfactant (i.e., besides AO). Non-limiting examples of other amphoteric surfactants include: derivatives of secondary and tertiary amines, derivatives of heterocyclic secondary and tertiary amines, or derivatives of quaternary ammonium, quaternary phosphonium or tertiary sulfonium compounds. Preferred examples include: betaine, including alkyl dimethyl betaine and cocodimethyl amidopropyl betaine, sulfo and hydroxy betaines, such as N-alkyl-N,N-dimethylammino-1-propane sulfonate where the alkyl group can be $C_8$-$C_{18}$ or $C_{10}$-$C_{14}$.

Diphenyl Ether-Based Anti-Microbial Agent

The diphenyl ether-based anti-microbial agent of the present invention is a nonionic compound. In the present invention, it has been found that due to its nonionic property, the anti-microbial agent of the present invention allows for a stable liquid detergent composition.

Preferably, the anti-microbial agent is a hydroxyl diphenyl ether. The anti-microbial agent herein can be either halogenated or non-halogenated, but preferably is halogenated. In one embodiment, the anti-microbial agent is a hydroxyl diphenyl ether of formula (I):

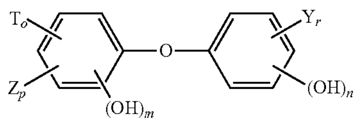

wherein:

each Y is independently selected from chlorine, bromine, or fluorine, preferably is chlorine or bromine, more preferably is chlorine, each Z is independently selected from $SO_2H$, $NO_2$, or $C_1$-$C_4$ alkyl, r is 0, 1, 2, or 3, preferably is 1 or 2, o is 0, 1, 2, or 3, preferably is 0, 1 or 2, p is 0, 1, or 2, preferably is 0, m is 1 or 2, preferably is 1, and n is 0 or 1, preferably is 0.

In the above definition for formula (I), 0 means nil. For example, when p is 0, then there is no Z in formula (I). Each Y and each Z could be the same or different. In one embodiment, o is 1, r is 2, and Y is chlorine or bromine. This embodiment could be: one chlorine atom bonds to a benzene ring while the bromine atom and the other chlorine atom bond to the other benzene ring; or the bromine atom bonds to a benzene ring while the two chlorine atoms bond to the other benzene ring.

More Preferably, the anti-microbial agent is selected from the group consisting of 4-4'-dichloro-2-hydroxy diphenyl ether ("Diclosan"), 2,4,4'-trichloro-2'-hydroxy diphenyl ether ("Triclosan"), and a combination thereof. Most preferably, the anti-microbial agent is 4-4'-dichloro-2-hydroxy diphenyl ether, commercially available from BASF, under the trademark name Tinosan®HP100.

In addition to the diphenyl ether, other anti-microbial agents may also be present, provided that these are not present at a level which causes instability in the formulation. Among such useful further antimicrobial agents are chelating agents, which are particularly useful in reducing the resistance of Gram negative microbes in hard water. Acid biocides may also be present.

Amphoteric Surfactant (AO)

The amphoteric surfactant suitable for use in the present invention can be selected from the group consisting of $C_6$-$C_{20}$ alkyldimethyl amine oxides (AO) and combinations thereof.

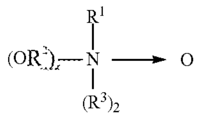

where $R^1$ is a $C_{6-20}$ alkyl, a $C_{6-20}$ hydroxyalkyl, or a $C_{6-20}$ alkyl phenyl group; each $R^2$ is a $C_{2-5}$ alkylene, or a $C_{2-5}$ hydroxyalkylene group; x is from 0 to about 3; and each $R^3$ is a $C_{1-3}$ alkyl, a $C_{1-3}$ hydroxyalkyl, or a polyethylene oxide containing from about 1 to about 3 ethoxylene (EO) units. Preferably, the amine oxide surfactant may be a $C_{8-18}$ alkyldimethyl amine oxide, preferably a $C_{10-16}$ alkyldimethyl amine oxide.

Preferably, the amphoteric surfactant is selected from the group consisting of dodecyldimethyl amine oxide, tetradecyldimethyl amino oxide, and a combination thereof. More preferably, the amphoteric surfactant contains dodecyldimethyl amino oxide having the following formula (II):

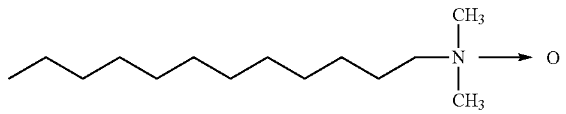

Such a compound is also referred to as lauryldimethyl amine oxide or dodecydimethyl amine-N-oxide (DDAO). It is commercially available from Huntsman under the tradename Oxamin® LO.

Polyamine

The laundry detergent composition herein may further comprise from 0.1% to 10%, preferably from 0.5% to 5%, by weight of the composition of a polyamine, preferably a polyethyleneimine, more preferably an alkoxylated polyethyleneimine.

The polyamine suitable for the laundry detergent composition herein may be of Mw higher than 400 g/mol. A preferred class of polyamines is polyethyleneimines (PEIs) and derivatives thereof such as ethoxylated PEI polymers, propoxylated PEI polymers, polyamines, polyquats, polyglycerol quats, and other PEI derivatives, their salts or mixtures thereof. In some preferred embodiments, the PEIs are branched, spherical polymeric amines, and the molecular weight of the PEI or PEI salt used is from about 800 daltons to about 2 million Daltons. In addition, in some preferred embodiments, the charge density of the PEI or PEI salt used is from about 15 meq/g to about 25 meq/g, more preferably from about 16 meq/g to about 20 meq/g. Examples of such preferred PEIs include the BASF products LUPASOL WF (25 kDa; 16-20 meq/g) and Lupasol® FG (800 daltons; 16-20 meq/g), and the SOKALAN® family of polymers available from BASF, e.g., SOKALAN® HP20, and SOKALAN® HP22 G.

Adjunct Ingredients

The laundry detergent composition herein may comprise adjunct ingredients. Suitable adjunct materials include but are not limited to: builders, chelating agents, rheology modifiers, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, photobleaches, perfumes, perfume microcapsules, structure elasticizing agents, fabric softeners, carriers, hydrotropes, processing aids, solvents, hueing agents, structurants and/or pigments. The precise nature of these adjunct ingredients and the levels thereof in the laundry detergent composition will depend on the physical form of the composition and the nature of the cleaning operation for which it is to be used.

In one embodiment, the composition herein comprises a rheology modifier (also referred to as a "structurant" in certain situations), which functions to adjust the viscosity of the composition so as to be more applicable to the packaging assembly. The rheology modifier herein can be any known ingredient that is capable of suspending particles and/or adjusting rheology to a liquid composition. Preferably the rheology modifier is selected from the group consisting of hydroxy-containing crystalline material, polyacrylate, polysaccharide, polycarboxylate, alkali metal salt, alkaline earth metal salt, ammonium salt, alkanolammonium salt, $C_{12}$-$C_{20}$ fatty alcohol, di-benzylidene polyol acetal derivative (DBPA), di-amido gallant, a cationic polymer comprising a first structural unit derived from methacrylamide and a second structural unit derived from diallyl dimethyl ammonium chloride, and a combination thereof. Preferably, the rheology modifier is a hydroxy-containing crystalline material generally characterized as crystalline, hydroxyl-containing fatty acids, fatty esters and fatty waxes, such as castor oil and castor oil derivatives. More preferably the rheology modifier is a hydrogenated castor oil (HCO).

In one embodiment, the composition may further comprise from 0.1% to 5%, preferably from 0.2% to 2%, by weight of the composition of a chelating agent, preferably diethylene triamine penta-acetic acid (DTPA) and/or glutamic acid diacetate (GLDA).

Composition Preparation

The laundry detergent composition of the present invention is generally prepared by conventional methods such as those known in the art of making laundry detergent compositions. Such methods typically involve mixing the essential and optional ingredients in any desired order to a relatively uniform state, with or without heating, cooling, application of vacuum, and the like, thereby providing laundry detergent compositions containing ingredients in the requisite concentrations.

Method of Use

Another aspect of the present invention is directed to a method of using the laundry detergent composition to treat a fabric with a microbial removal benefit and optionally a microbial preventive benefit and/or a biofilm removal benefit. The method comprises the step of administering from 1 g to 200 g of the above-mentioned laundry detergent composition into a laundry washing basin comprising water to form a washing solution. The washing solution in a laundry washing basin herein preferably has a volume from 1 L to 50 L, alternatively from 1 L to 20 L for hand washing and from 20 L to 50 L for machine washing. Preferably, the microbial removal benefit herein is determined by the method as described in Test 1 (D&S FTC Jokin method) and the microbial preventive benefit herein is determined by the method as described in Test 2 (JIS L1902 method). The temperatures of the laundry washing solution preferably range from 5° C. to 60° C.

The dosing amount in the method herein may be different depending on the washing type. In one embodiment, the method comprises administering from about 1 g to about 60 g of the laundry detergent composition into a hand washing basin (e.g., about 2-4 L). In an alternative embodiment, the method comprises administering from about 1 g to about 200 g, preferably from about 10 g to about 65 g of the laundry detergent composition into a washing machine (e.g., about 30-45 L).

Preferably, the method herein further comprises the step of contacting a soiled fabric with the washing solution. For example, the presence of Gram-positive bacteria and/or Gram-negative bacteria is suspected on the fabric. The step of contacting the soiled fabric with the washing solution is preferably after the step of administering the laundry detergent composition in a laundry washing basin. The method may further comprise the step of contacting a fabric with the laundry detergent composition prior to the step of administering the laundry detergent composition in a laundry washing basin, i.e., pre-treat the fabric with the laundry detergent composition for certain time, preferably from 1 minute to 10 minutes.

Test Method

Test 1: Efficacy of Microbial Removal (D&S FTC Jokin)

The efficacy of microbial removal for laundry detergent compositions is determined by the method as defined in the D&S FTC Jokin method and described hereinafter.

1. Microorganism Preparation:
   - A. Subculture microorganism(s) on Nutrient Agar through at least one daily transfer, incubating at 35±2° C.
   - B. On the day prior to testing, transfer the cells into another Nutrient Agar. Incubate 18 to 24 h at 35±2° C. agar side down.
   - C. Remove growth from the agar plate using three-nit dilution fluid and five sterile glass beads to suspend growth. The cultures will be standardized to yield approximately $10^8$ colony forming units (CFU) per mL of *S. aureus* and $10^9$ CFU/mL of *K. pneumoniae* and *E. coli.*
   - D. Add horse serum (5% v/v) as soil load to each inoculum of working culture.
2. Fabric and Spindle Preparation:
   - A. Scour test fabric by boiling approximately 300 g of material for 1 h in 3 L of distilled or deionized water containing 1.5-g sodium carbonate and 1.5-g nonionic wetting agent. Rinse fabric, first in boiling water and then in cold water, until all visual traces of wetting agent are removed (that is, foaming). Remove as much water as possible from fabric.
   - B. Air dry for at least 24 h at ambient room temperature ensuring the material is completely dry.
   - C. Cut scoured dry fabric into strips 2 in. (5 cm) wide and weighing 15±0.1 g each. Pierce one end of the 15-g test fabric strip and secure onto the outer horizontal extension of a stainless steel spindle. Wind the strip around the three horizontal extensions with sufficient tension to obtain 12 but not 13 laps while using the entire 15 6 0.1 g of fabric. Staples, a pin, or autoclavable fabric tag may be used to secure the fabric.
   - D. Fabric carriers of approximately 1 by 1.5 in. will be cut from the remaining scoured fabric. Nontoxic permanent marker may be used to place a mark on the edge of each carrier.
   - E. For each challenge microorganism, prepare at least 3 fabric carriers and 1 fabric wrapped spindle for each active test formulation/product and control/numbers control.

3. Procedure:
   A. Inoculate three sterile fabric carriers (in a single sterile Petri dish) with 0.020 mL of prepared inoculum per carrier. Disperse the inoculum over an approximate 1-by 1.5 in. area of each carrier, avoiding the marker, staple, or safety pin. Dry the carriers in a 35±2° C. 80% RH incubator until the carriers are visibly dry, but not longer than 30 min.
   B. Using sterile forceps, aseptically place two dried inoculated carriers in an upright position between the ninth and tenth folds of a single wrapped spindle and another one carrier between the tenth to eleven folds. secure individual swatches by tucking them deeply into the preformed "pockets." Do not allow the inoculated carriers to overlap. The marker, staple, safety pins, or autoclavable fabric tag will allow for easy removal at the end of the procedure.
   C. To simulate washing machines, aseptically place the spindle into the sterile exposure chamber.
   D. Add 250 ml test samples (diluted active test formulations and controls).
   E. Firmly close exposure chamber.
   F. Place the exposure chamber into the agitator for the specified exposure period (25° C., 10 min, 60 rpm).
   G. Using large, sterile forceps or sterile gloves, remove spindle from exposure chamber, wring the solution and aseptically remove each fabric carrier to a separate wide mouth tube containing 10 mL neutralizing broth.
   H. All tubes containing fabric carriers will be mixed on a Vortex-type mixer for approximately ten seconds. Alternatively, other methods such as a foot-arc technique or sonication may be used to extract surviving microorganisms from fabric swatches.
   I. Serially dilute the neutralizing broth containing a single carrier. Plate 1.0 mL in duplicate of $10^{-1}$ through $10^{-4}$ dilutions in or on agar containing neutralizers as needed. Incubate plates at 35±2° C. for 48±2 h. To determine survivors, count colonies and record as CFU/plate. Average duplicate plates and multiply by the dilution factor to arrive at CFU/carrier. This average count should be converted into $\log_{10}$. Take the $\log_{10}$ value of CFU value as Nb.
   J. (Numbers control) In place of the test formulations, use 0.05% Tween80 and follow the above steps in the same manner as the test formulations. Take the $\log_{10}$ value of CFU value for the numbers control as Na.
4. Calculation of Microbial Removal Activity Value:

$$\text{Microbial Removal Activity(Log } R) = Na - Nb$$

A Microbial Removal Activity Value of no less than 2.0 represents acceptable microbial removal efficacy. And a Microbial Removal Activity Value of lower than 2.0 indicates unacceptable poor microbial removal efficacy.

Test 2: Efficacy of Microbial Prevention (JIS L1902)

The efficacy of microbial prevention for laundry detergent compositions is determined by the method as defined in the JISL 1902 method and described hereinafter.

1. Microorganism Preparation:
   A. Aseptically add certain amount of nutrient broth into a lyophilized culture of *Staphylococcus aureus, Escherichia coli* or *Klebsiella pneumoniae*. Dissolve and suspend the culture in the nutrient broth to obtain a suspension. Streak a loop of the suspension onto a nutrient agar plate, and incubate at 37° C. for 24 hours to obtain a first generation subculture of bacterial suspension. Transfer a colony of the first generation subculture of bacterial suspension into 20 mL of nutrient broth with shaking, and incubate at 37° C. for 24 hours to obtain a second generation subculture of bacterial suspension. Transfer 0.4 mL of the second generation subculture of bacterial suspension into another 20 mL of nutrient broth with shaking, and incubate at 37° C. for 3±1 hours to obtain a third generation subculture of bacterial suspension.
   B. Dilute the third generation subculture of bacterial suspension by 1/20 diluted nutrient broth to a concentration of $1\times10^5$ cfu/mL to $3\times10^5$ cfu/ml to obtain a working culture.
   C. Store the working culture at 4° C. and use within 4 h.
2. Fabric Washing:
   A. Boil two fabric strips each having a width of 1 m and length of 3 m (32 yarn/cm×32 yarn/cm, 100% plain weave cotton) in 5 L of a solution for 1 hour. The solution is prepared by 2.5 g of a nonionic soaked agent, 2.5 g of sodium carbonate, and 5000 mL of distilled water. The nonionic soaked agent is prepared by 5.0 g of alkylphenol ethoxylate, 5 g of sodium carbonate, and 1000 mL of distilled water. Rinse the fabric strips in boiled deionized water for 5 minutes. Place the fabric strips in cool deionized water for 5 minutes, and indoor dry.
   B. Fix one end of the test fabric strip obtained from step 2A onto a stainless steel spindle at an outer position along the horizontal extension of the stainless steel spindle. The stainless steel spindle has 3 horizontal stands that are connected to one another. Wrap the test fabric strip around the 3 horizontal stands of the stainless steel spindle with sufficient tension to obtain a fabric wrapped spindle having 12 laps of fabric. Fix the other end of the test fabric strip onto the outer lap of the 12 laps of fabric via a pin. Sterilize the fabric wrapped spindle with pressure steam at 121° C. for 15 minutes.
   C. Dissolve 5.903 g of calcium chloride dihydrate and 2.721 g of magnesium chloride hexahydrate in 100 mL of distilled water, and then sterilize the mixture with pressure steam at 121° C. for 20 minutes. Add 1 mL of the mixture into 1 L of distilled water to obtain a hard water solution.
   D. Add sufficient amount of sample into 1 L of the hard water solution obtained from step 2C to obtain a solution having a concentration of 1055 ppm. Mix the solution by a magnetic stirrer for 4 minutes. Distribute 250 mL of the mixed solution into an exposure chamber to obtain a washing solution. Place the exposure chamber in a water bath and achieve the test temperature of (25±1°) C.
   E. Aseptically soak the fabric wrapped spindle obtained from step 2B into the washing solution in the exposure chamber, and close the exposure chamber with a lid.
   F. Fix the exposure chamber onto a tumbler. Rotate the tumbler for 10 minutes. Then remove the fabric wrapped spindle from the exposure chamber. Place the fabric wrapped spindle in Haier iwash-1p Top Load Washing Machine and spin-dry for 2 minutes.
   G. Discard the washing solution from the exposure chamber, and then add 250 mL of sterilized distilled water into the exposure chamber. Soak the spin-dried fabric wrapped spindle in the newly added distilled water in the exposure chamber. Rotate the tumbler for 3 minutes and spin-dry for 2 minutes.

H. Repeat step 2G.

I. Aseptically remove the fabric wrapped spindle out of the exposure chamber and remove the test fabric strip from the spindle. Air dry the test fabric strip overnight.

3. Fabric Incubation:

A. Cut the washed test fabric strip obtained from step 2I to square pieces having a side length of 2 cm. Obtain six test specimens with a mass of 0.40 g±0.05 g for the following steps.

B. Put each set of specimens into a vial, and then sterilize the specimens with pressure steam at 121° C. for 15 minutes. After the sterilization, dry the specimens for 1 hour in a clean bench without a cap.

C. Inoculate 0.2 mL of the working culture obtained from step 1B onto each dried specimen. Immediately after the inoculation, extract the bacteria on 3 test specimen, plate with nutrient agar and incubate at 37° C. for 24-48 hours. Count the total colony-forming units (CFU) of each set of specimens, and obtain average results of the 3 sets. Take the log 10 value of CFU value as $T_0$. Incubate other 3 vials containing the inoculated specimens at 37° C. for 18 to 24 hours.

D. Extract survivors on the incubated specimens, plate with nutrient agar, and incubate at 37° C. for 24-48 hours. Count the total colony-forming units (CFU) of each set of specimens, and obtain average results of the 3 sets. Take the log 10 value of CFU value as $T_t$.

E. In steps 3A-3D, use the fabric strip obtained from step 2A (that does not experience steps 2B-2I) as control. Take the log 10 value of CFU value as $C_0$ and $C_t$ accordingly.

4. Calculation of Bacteriostatic Activity Value:

$$\text{Bacteriostatic Activity Value}=(C_t-C_0)-(T_t-T_0)$$

A Bacteriostatic Activity Value of no less than 2.0 represents acceptable microbial preventive efficacy, and of no less than 3.0 represents excellent microbial preventive efficacy. And a Bacteriostatic Activity Value of lower than 2.0 indicates unacceptable poor microbial preventive efficacy.

Test 3: Fabric Deposition Test for Anti-Microbial Agents

Anti-microbial agents are extracted from treated fabrics by using the methanol-based Accelerated Solvent Extraction (ASE) method described hereinafter. The resulting extract is then subjected to gradient reversed-phase high performance liquid chromatographic (HPLC) separation on a C18 column and is quantified by tandem mass spectrometry (MS/MS) operating under multiple reaction monitoring (MRM) conditions at negative mode.

As a first step, about three (3) grams of the treated fabrics is accurately weighed and then filled into a steel ASE tube. The extraction protocol is run for about five (5) minutes using methanol as the extraction solvent at an elevated temperature of about 100° C. and a pressure of about 2000 pound per square inch (psi). The resulting extract is collected and transferred into a 25-ml flask, which is then filled to its full volume with methanol. The resulting solution is then diluted by about twenty-five (25) fold by using a mixture of methanol and water at a 50:50 ratio, which is used as an injection sample for the subsequent LC-MS/MS analysis.

Next, about five (5) ul of the above-mentioned injection sample is injected and separated on a Waters ACQUITY UPLC C18 column with gradient from about 70% mobile phase A (1% formic water solution)/30% mobile phase B (0.1% formic acid in methanol) to 5% mobile phase A/95% mobile phase B in about three (3) minutes, and the final gradient is kept for another three (3) minutes. The anti-microbial agent, for example Tinosan®HP100, is detected at the negative MRM mode. The ion pair of m/z 253>142 is used as quantification transition, while m/z of 253>125 is used for identification.

Subsequently, spiked matrix standards in the range of 0.5 mg/ml to 500 ng/ml are injected for creation of a calibration curve. Concentration of the anti-microbial agent, for example Tinosan®HP100, in the injection sample is determined by extrapolation using weighted ($1/x^2$) quadratic regression of the calibration curve.

Test 4: Biofilm Removal Test Including Biofilm Generation (ASTM E2562) and Removal in Washing Machines 1. Culture Preparation

*Pseudomonas aeruginosa* is the organism used in this test. Aseptically remove an isolated colony from an R2A plate and place into 100 mL of sterile TSB (300 mg/L). Incubate bacterial suspension in an environmental shaker at 36±2° C. for 22±2 h. Viable bacterial density should equal $10^8$ CFU/mL, and may be checked by serial dilution and plating.

2. Reactor Preparation

A. Sonicate coupons in soap and tap water, rinse and sonicate the coupons with reagent grade water until no soap is left on the coupons.

B. Place a coupon into each hole in the reactor rods, tighten set screw. Place rods into reactor top loosely.

C. Invert the reactor top and place baffle onto glass rod positioned in the center of the reactor top.

D. Invert the reactor beaker and place onto the assembled top. Turn the reactor over so that the reactor top is upright.

E. Connect the bacterial air vent by fitting the vent to a small section of appropriately sized tubing, and attach to one of the rigid tubes on the reactor top.

F. The glass flow break is spliced into the nutrient tubing line near the reactor top.

G. Place the reactor top securely on the beaker before sterilization. To allow for pressure escape, do not set rod alignment pins in notches during sterilization.

H. Cover the end of the nutrient tubing that connects to the nutrient carboy and the end of the overflow (waste) tubing with aluminum foil. Cover any extra openings on the reactor top with aluminum foil. This is to maintain sterility after autoclaving.

I. Prepare batch culture medium by dissolving bacterial liquid growth medium (300 mg/L TSB) in 500 mL reagent grade water in an autoclavable container.

J. Sterilize the reactor system and separate batch culture medium for 20 min on the liquid cycle of a steam sterilizer.

3. Procedure

A. With the overflow (waste) line clamped, aseptically add the cooled batch culture medium to the cooled reactor.

B. Place reactor onto a stir plate.

C. Clamp flow break in upright position; leave other tubing clamped and foiled.

D. Secure the rod alignment pins into the reactor top notches.

E. Inoculate the reactor with 1 mL of bacteria from the culture prepared previously (see 2I): Aseptically pipette the inoculum into the reactor through one of the available rigid reactor top tubes.

F. Turn on the magnetic stir plate. Set the rotational speed to 125±5 r/min. The reactor system incubates in batch mode at room temperature (21±2° C.) for 24 h.

G. Prepare 100 mg/L TSB continuous flow nutrient broth. Dissolve and sterilize the broth in a smaller volume to prevent caramelization. Aseptically pour the concentrated broth into a carboy of sterile reagent grade water to make a total of 20 L.

H. Aseptically connect the nutrient tubing line to the carboy containing the continuous flow nutrient broth.

I. Pump a continuous flow of nutrients into the reactor at a flow rate determined by dividing the reactor volume by a 30 minute residence time. Attach tubing from the drain spout to a waste carboy and remove clamp. The drain spout on the beaker allows overflow to occur, maintaining a constant bacterial liquid growth broth concentration of 100 mg/L in the reactor during CSTR (continuously stirred tank reactor) mode.

J. Operate the reactor in SCTR mode for 24 h.

4. Product Treatment

A. Turn off growth medium flow and baffled stir bar.

B. Aseptically remove a randomly selected rod containing coupons with biofilm from the CDC Biofilm Reactor by pulling it straight up and out of the reactor.

C. Rinse the coupons to remove planktonic cells: orient the rod in a vertical position directly over a 50 mL conical tube containing 30 mL sterile buffered water. With one continuous motion, immerse the rod into the buffered water with minimal to no splashing, then immediately remove. Use a new 50 mL conical tube with 30 mL sterile buffered water for each rod.

D. Prepare the product solutions in hardness water with recommended dosage (1000 ppm).

E. Place two rods into a customized beaker with top can hold the rods vertically. Transfer 350 ml product solution in the beaker.

F. Put the beaker onto a magnetic stir plate and agitate for 10 mins at 350 rpm. Then discard the product solution and add 350 ml fresh water to rinse the coupons for 3 mins at 350 rpm. Repeat the rinse once.

G. Apply 6-cycles product treatment for the coupons for each sample (step 4E-4F).

H. For control, use 0.05% Tween80 to replace product solution and follow same treatments.

I. Remove an appropriate number of coupons for testing in individual tubes. Obtain a set of five coupons for each treatment and a set of three coupons for the controls.

J. Add 3 ml PBS solution into each tube containing one treated coupon.

K. Vortex each tube on the highest setting, ensuring a complete vortex for 30±5 s.

L. Sonicate the tubes at 45±5 kHz for 30±5 s at room temperature (21±2° C.) (use normal mode if sonicator has variable settings).

M. Vortex each tube on the highest setting, ensuring a complete vortex for 30±5 s.

N. Sonicate the tubes at 45±5 kHz for 30±5 s at room temperature (21±2° C.) (use normal mode if sonicator has variable settings).

O. Vortex each tube on the highest setting, ensuring a complete vortex for 30±5 s. These tubes are the 10° dilution.

P. Dilute and count bacteria amount on each coupon, transfer the value to $\log_{10}$ and take the average of control coupons and product treated coupons.

5. Calculation of Biofilm Removal Efficacy $$\text{Log Reduction}=\text{average of }\log_{10}(\text{control coupons})-\text{average of }\log_{10}(\text{product treated coupons}).$$

Test 5: Virus Removal Test

The efficacy of virus removal for laundry detergent compositions is determined by the following method which is the same with the above mentioned Test 1: Efficacy of Microbial Removal except that virus is employed instead of bacteria and proper host cells were used for different virus (e.g. MDCK cell ATCC CCL-34 was used for Influenza virus, CRFK cell ATCC CLL-94 was used for Feline calicivirus), plaque assay or TCID50 method are used for virus counting.

EXAMPLES

Example 1: Comparative Test Showing Effective Microbial Removal by Low-pH Liquid Detergent Composition Containing Surfactant System and Organic Acid Seven (7) sample liquid laundry detergent compositions were prepared containing the ingredients as shown in Table 1 below, in which Samples 1 to 4 comprise a surfactant system containing a non-ionic (NI) surfactant and an anionic (AI) surfactant as well as a relatively high level of citric acid (CA) (i.e., at least 7%) resulting in low product pH (i.e. from around 2 to around 3.2), Samples 5 and 6 comprise a similar surfactant system with Samples 1 to 4 but low level of CA (i.e., less than 4%) resulting in relatively high product pH (i.e., around 3.7 to around 8), and Sample 7 comprises a high level of citric acid resulting in low pH but no surfactants.

TABLE 1

| Ingredients (wt %) | 1 (high CA) | 2 (high CA) | 3 (high CA) | 4 (high CA) | 5 (low CA) | 6 (low CA) | 7 (high CA w/o surf.) |
|---|---|---|---|---|---|---|---|
| Citric acid | 14 | 7 | 14 | 7 | 3.88 | 0.04 | 23 |
| Anionic surfactant [a] | 6.5 | 6.5 | 12.7 | 12.7 | 6.5 | 12.7 | — |
| Non-ionic surfactant [b] | 12.7 | 12.7 | 6.5 | 6.5 | 12.7 | 6.5 | — |
| Tinosan ®HP100 [c] | 0.05 | 0.05 | 0.05 | 0.05 | 0.05 | 0.05 | — |
| Na-DTPA | 0.29 | 0.29 | 0.29 | 0.29 | 0.29 | 0.29 | — |
| Polyethyleneimines [d] | 2.82 | 2.82 | 2.82 | 2.82 | 2.82 | 2.82 | — |
| Brightener | 0.1 | 0.1 | 0.1 | 0.1 | 0.1 | 0.1 | — |
| Sodium hydroxide | ad pH below | ad pH below | ad pH below | ad pH below | ad pH below | ad pH below | ad pH below |
| Water | Balance | Balance | Balance | Balance | Balance | Balance | Balance |
| Total surfactants | 19.2 | 19.2 | 19.2 | 19.2 | 19.2 | 19.2 | — |
| Ratio of AI/NI | 0.51 | 0.51 | 1.95 | 1.95 | 0.51 | 1.95 | — |
| Product pH | 2.60 | 3.21 | 2.53 | 2.06 | 3.78 | 8.12 | 2.50 |

[a] $C_{11-13}$LAS

[b] Neodol ®25-7 which is $C_{12}$-$C_{15}$ alcohol ethoxylated with an average of 7 moles of ethylene oxide as a nonionic surfactant, available from Shell

[c] Tinosan ®HP100 is 4-4'-dichloro-2-hydroxy diphenyl ether, available from BASF

[d] Polyethyleneimines (PEI) polymer ethoxylated or ethoxylated and propoxylated, available from BASF Then, the efficacy of microbial removal for the above samples at a dose of 1000 ppm finished product was determined in accordance with Test 1: Efficacy of Microbial Removal in which Gram-negative bacteria *E. coli* was used. The results are shown below.

TABLE 2

| | 1 (high CA) | 2 (high CA) | 3 (high CA) | 4 (high CA) | 5 (low CA) | 6 (low CA) | 7 (high CA w/o surf.) |
|---|---|---|---|---|---|---|---|
| Citric acid | 14 | 7 | 14 | 7 | 3.88 | 0.04 | 23 |
| Product pH | 2.60 | 3.21 | 2.53 | 2.06 | 3.78 | 8.10 | 2.50 |
| TTW pH | 3.38 | 3.80 | 3.30 | 3.46 | 4.50 | 6.35 | 3.35 |
| Efficacy of Microbial Removal (LogR) | 4.1 | 3.3 | 4.1 | 3.9 | −0.7 | −0.4 | 0.2 |

As the data shown above, it is surprising and completely unexpected that the combination of the surfactant system and a relatively high level of organic acid (i.e., corresponding to low pH) can deliver a very strong microbial removal efficacy (i.e., more than log 3 reduction, even more than log 4 reduction). In other words, the Samples 1 to 4 can remove more than 99.9% (even more than 99.99% in Samples 1 and 3) microorganisms in the microbial removal test. On the contrary, the surfactant system alone (Samples 5 and 6) or the organic acid alone (Sample 7) does not show any significant efficacy of microbial removal (i.e. around log 0 reduction).

Example 2: Comparative Test Showing Effective Microbial Prevention by Low-pH Liquid Detergent Composition Containing Surfactant System and Organic Acid Four (4) sample liquid laundry detergent compositions are prepared containing the ingredients as shown in Table 3 below, in which Samples 8 and 9 comprise a surfactant system containing an anionic (AI) surfactant and a non-ionic (NI) surfactant with different ratios as well as a relatively high level of citric acid (CA) (i.e. 14.1%) resulting in low product pH (i.e., around 2.4 to 2.6), while Samples 10 and 11 comprise a similar surfactant system with Samples 8 and 9 but low level of CA resulting in relatively high product pH (i.e., above 8).

TABLE 3

| Ingredients (wt %) | 8 (high CA) | 9 (high CA) | 10 (low CA) | 11 (low CA) |
|---|---|---|---|---|
| Citric acid | 14.1 | 14.1 | 1.25 | 1.2 |
| Anionic surfactant [a] | 6.48 | 9.6 | 6.48 | 9.6 |
| Non-ionic surfactant [b] | 12.72 | 9.6 | 12.72 | 9.6 |
| Tinosan ®HP100 [c] | 0.05 | 0.05 | 0.05 | 0.05 |
| Na-DTPA | 0.29 | 0.29 | 0.29 | 0.29 |
| Polyethyleneimines [d] | 2.82 | 2.82 | 2.82 | 2.82 |
| Brightener | 0.1 | 0.1 | 0.1 | 0.1 |
| Sodium hydroxide | ad pH below | ad pH below | ad pH below | ad pH below |
| Water | Balance | Balance | Balance | Balance |
| Total surfactants | 19.2 | 19.2 | 19.2 | 19.2 |
| Ratio of AI/NI | 0.51 | 1 | 0.51 | 1 |
| Product pH | 2.60 | 2.49 | 8.10 | 8.12 |

[a] $C_{11}$-$_{13}$LAS

[b] Neodol ®25-7 which is $C_{12}$-$C_{15}$ alcohol ethoxylated with an average of 7 moles of ethylene oxide as a nonionic surfactant, available from Shell

[c] Tinosan ®HP100 is 4-4'-dichloro-2-hydroxy diphenyl ether, available from BASF

[d] Polyethyleneimines (PEI) polymer ethoxylated or ethoxylated and propoxylated, available from BASF Then, the efficacy of microbial prevention for the above samples at a dose of 1000 ppm finished product is determined in accordance with Test 2: Efficacy of Microbial Prevention in which Gram-negative bacteria *Klebsiella pneumoniae* was used. The results are shown below:

TABLE 4

| | 8 (high CA) | 9 (high CA) | 10 (low CA) | 11 (low CA) |
|---|---|---|---|---|
| Citric acid | 14.1 | 14.1 | 1.25 | 1.2 |
| Product pH | 2.60 | 2.49 | 8.10 | 8.12 |
| TTW pH | 3.44 | 3.12 | 6.60 | 4.50 |
| Efficacy of Microbial Prevention (LogR) | 3.5 | 3.8 | 2.4 | 2.8 |

It is greatly surprising from the data as shown above that the efficacy of microbial prevention is significantly improved in the low-pH liquid detergent composition compared to high-pH liquid detergent composition (i.e., 3.5 vs 2.4 and 3.8 vs 2.8). In other words, the introduction of a significant amount of organic acid (i.e., citric acid) results in a reduction of one order of magnitude of CFU (i.e. the count of bacteria) on fabrics treated by the low-pH liquid detergent composition compared to high-pH liquid detergent composition. Without being bound by any theory, it is believed that the anti-microbial agent (i.e., Tinosan in this example) more effectively deposits onto the fabrics during a washing cycle by using the low-pH liquid detergent composition according to the present invention and subsequently the deposited (i.e., residual) anti-microbial agent more effectively prevents bacteria growth onto the fabrics during drying or storage or wear. Further, when a higher level of anionic surfactants is present, an even more improved efficacy of microbial prevention can be obtained. Without being bound by any theory, it is believed that the anti-microbial agent (i.e., Tinosan) more effectively deposits onto the fabrics during a washing cycle in the presence of a higher level of anionic surfactants (i.e., LAS).

Example 3: Comparative Test Showing Effective Biofilm Removal by Low-pH Liquid Detergent Composition Containing Surfactant System and Organic Acid Three (3) sample liquid laundry detergent compositions are prepared containing the ingredients as shown in Table 5 below, in which Samples 12 and 13 comprise a surfactant system containing an anionic (AI) surfactant and a non-ionic (NI) surfactant as well as a relatively high level of citric acid (CA) (i.e. 14.1% or 10.0%) resulting in low product pH (i.e., around 2.4 to 2.6), while Samples 14 comprise a similar surfactant system with Samples 12 and 13 but low level of CA resulting in relatively high product pH (i.e., above 8).

TABLE 5

| Ingredients (wt %) | 12 (high CA) | 13 (high CA) | 14 (low CA) |
|---|---|---|---|
| Citric acid | 14.1 | 10.0 | 0.6 |
| Anionic surfactant [a] | 6.48 | 6.48 | 6.0 |
| Non-ionic surfactant [b] | 12.72 | 12.72 | 12.92 |
| Tinosan ®HP100 [c] | 0.05 | 0.05 | 0.04 |
| Na-DTPA | 0.29 | 0.29 | 0.29 |
| Polyethyleneimines [d] | 2.82 | 2.82 | 1.82 |
| Brightener | 0.1 | 0.1 | 0.1 |
| Sodium hydroxide | ad pH below | ad pH below | ad pH below |
| Water | Balance | Balance | Balance |
| Total surfactants | 19.2 | 19.2 | 19.2 |
| Ratio of AI/NI | 0.51 | 0.51 | 0.51 |
| Product pH | 2.60 | 2.49 | 8.10 |

[a] $C_{11}$-$_{13}$LAS
[b] Neodol ®25-7 which is $C_{12}$-$C_{15}$ alcohol ethoxylated with an average of 7 moles of ethylene oxide as a nonionic surfactant, available from Shell
[c] Tinosan ®HP100 is 4-4'-dichloro-2-hydroxy diphenyl ether, available from BASF
[d] Polyethyleneimines (PEI) polymer ethoxylated or ethoxylated and propoxylated, available from BASF Then, the efficacy of biofilm removal for the above samples at a dose of 1000 ppm finished product is determined in accordance with Test 4: Biofilm Removal Test including biofilm generation (ASTM E2562) and removal in washing machines in which Gram-negative bacteria *P. aeruginosa* was used. The results are shown below:

TABLE 6

| | 12 (high CA) | 13 (high CA) | 14 (low CA) |
|---|---|---|---|
| Citric acid | 14.1 | 10.0 | 0.6 |
| Product pH | 2.60 | 2.49 | 8.10 |
| TTW pH | 3.36 | 3.41 | 6.60 |
| Efficacy of Biofilm Removal (LogR) | 2.43 | 2.54 | 0.89 |

It is greatly surprising from the data as shown above that the efficacy of biofilm removal is significantly improved in the low-pH liquid detergent composition compared to high-pH liquid detergent composition (i.e., 2.43 or 2.54 vs 0.89).

Example 4: Comparative Test Showing Effective Virus Removal by Low-pH Liquid Detergent Composition Containing Surfactant System and Organic Acid Test sample liquid laundry detergent composition is prepared containing the ingredients as shown in Table 7 below, in which Sample 15 comprise a surfactant system containing an anionic (AI) surfactant and a non-ionic (NI) surfactant as well as a relatively high level of citric acid (CA) (i.e. 14.1%) resulting in low product pH (i.e., about pH 2.6), while Sample 16 is a normal pH (i.e. about pH 8.1) liquid detergent composition.

TABLE 7

| Ingredients (wt %) | 15 Inventive | 16 Normal pH |
|---|---|---|
| Citric acid | 14.1 | 2.0 |
| $C_{11}$-$_{13}$LAS | 6.48 | 10.1 |
| $C_{12-14}$ AE3S | — | 1.4 |
| Non-ionic surfactant [a] | 12.72 | 6.1 |
| Tinosan ®HP100 [b] | 0.05 | 0.05 |
| Na-DTPA | 0.29 | 0.29 |
| Polyethyleneimines [c] | 2.82 | 2.82 |
| Brightener | 0.1 | 0.1 |
| Sodium hydroxide | ad pH below | ad pH below |
| Water | Balance | Balance |
| Total surfactants | 19.2 | 17.6 |
| Ratio of AI/NI | 0.51 | 0.51 |
| Product pH | 2.60 | 8.1 |

[a] Neodol ®25-7 which is $C_{12}$-$C_{15}$ alcohol ethoxylated with an average of 7 moles of ethylene oxide as a nonionic surfactant, available from Shell
[b] Tinosan ®HP100 is 4-4'-dichloro-2-hydroxy diphenyl ether, available from BASF
[c] Polyethyleneimines (PEI) polymer ethoxylated or ethoxylated and propoxylated, available from BASF Then, the efficacy of virus removal for the above samples at a dose of 1000 ppm finished product is determined in accordance with Test 5: Virus Removal Test in which enveloped virus (i.e. Influenza virus) and non-enveloped virus (i.e. Feline calicivirus) were both tested. The results are shown below:

TABLE 8

| | 15 Inventive | 16 Comparative |
|---|---|---|
| Efficacy of Virus Removal (LogR) on Non enveloped virus | 2.49 | 0.24 |
| Efficacy of Virus Removal (LogR) on enveloped virus | >4.26 | 3.7 |

The data shows that the efficacy of virus removal is significantly improved in the low-pH liquid detergent composition compared to the normal pH liquid detergent composition. Especially, low pH liquid detergent composition according to the present invention is capable of efficiently removing non-enveloped virus.

Example 5: Comparative Test Showing Further Improved Microbial Prevention by the Combination of Low-pH Liquid Detergent Composition and Low-pH Rinse Composition A low pH liquid laundry detergent composition is prepared containing the same ingredients with Sample 15 as shown in Table 7 above except a lower level of Tinosan (0.025%). Also, a low pH rinse composition (pH 2.5) is prepared containing citric acid at a level of more than 10%. Then, the efficacy of microbial prevention for the above samples at a dose of 1000 ppm finished product is determined in accordance with Test 2: Efficacy of Microbial Prevention in which Gram-negative bacteria *Klebsiella pneumoniae* was used and in Step 2G the low pH rinse composition diluted in water at a dose of 1000 ppm is used instead of distilled water. It is greatly surprising that the efficacy of microbial prevention is significantly improved by replacing water with the low pH rinse composition during the rinse step.

Example 6: Exemplary Formulations of Liquid Laundry Detergent Compositions

The following liquid laundry detergent compositions shown below are made comprising the listed ingredients in the listed proportions (weight %).

TABLE 9

| | A | B | C | D | E | F | G |
|---|---|---|---|---|---|---|---|
| $C_{12}$-$_{14}AE_{1\text{-}3}S$ | 1 | 0.5 | — | — | 2 | 2 | 6.0 |
| $C_{11}$-$_{13}LAS$ | 13.0 | 18.5 | 16.0 | 16.0 | 3.2 | 6.4 | 11.7 |
| Neodol ®25-7 | 6.5 | 0.0 | 3.2 | 3.2 | 6.4 | 3.2 | 0 |
| Dodecyldimethyl amine oxide | 0.5 | 0.5 | 0.5 | 0.5 | 0.5 | 0.5 | 0 |
| Citric acid | 2.0 | 5.0 | 4.0 | 1.0 | 7 | — | 10 |
| Lactic acid | 3.0 | — | — | 6.0 | 7 | 10 | 0 |
| C8-C10 fatty acid | — | — | 4.0 | 1.0 | 1.0 | — | — |
| Boric acid | — | 1.0 | 1.5 | 0.90 | 0.90 | — | — |
| $C_{12}$-$C_{18}$ fatty acid | 0.5 | 0.5 | — | 0.5 | — | — | — |
| Na-DTPA | 0.2 | 0.29 | 0.4 | — | — | — | — |
| GLDA | — | — | — | 1.0 | 0.5 | — | 1.0 |
| 1,2 propanediol | 1.3 | 1.2 | 2.5 | 0.38 | 3.0 | 1.0 | 1.0 |
| Sodium cumene sulphonate | 2.0 | 4.0 | 1.0 | 2.5 | 1.0 | 2.0 | 3.0 |
| Ethanol | — | — | — | 0.5 | — | — | — |
| Monoethanolamine (MEA) | 0.15 | 0.15 | 0.15 | 0.15 | 0.15 | 0.15 | 0 |
| Hydrogenated castor oil with MEA | 0.1 | 0.1 | 0.1 | 0.1 | 0.1 | 0.1 | 0.1 |
| Sodium polyacrylate | 1.4 | 1.4 | 1.4 | 1.4 | 1.4 | 1.4 | 1.4 |
| Polyethyleneimines | — | — | — | 1.18 | — | — | — |
| NaOH | Up to pH 2.5 | Up to pH 2.5 | Up to pH 2.5 | Up to pH 2.5 | Up to pH 2.5 | Up to pH 2.5 | Up to pH 2.5 |
| Na Formate | — | — | — | 0.02 | — | — | — |
| Tinosan ®HP100 | 0.05 | 0.07 | 0.10 | 0.07 | 0.07 | 0.07 | 0.07 |
| Brightener | — | 0.06 | 0.06 | 0.04 | 0.06 | 0.06 | 0.06 |
| Protease | — | — | 0.45 | 0.29 | — | — | 0.10 |
| Amylase | — | — | 0.08 | — | — | — | 0.10 |
| Dye | — | 0.002 | 0.002 | 0.001 | 0.005 | 0.005 | 0.005 |
| Perfume oil | — | 0.6 | 0.6 | 0.5 | 1.2 | 0.7 | 1.0 |
| Perfume encapsulate | — | 0.12 | 0.24 | — | — | 0.12 | 0.12 |
| Water | Balance | Balance | Balance | Balance | Balance | Balance | Balance |

The liquid laundry detergent compositions A-F in Example 4 are prepared by the following steps:

a) mixing a combination of NaOH (if any) and water in a batch container by applying a shear of 200 rpm;

b) adding citric acid (if any), boric acid (if any), and $C_{11}$-$C_{13}$ LAS into the batch container, keeping on mixing by applying a shear of 200 rpm;

c) cooling down the temperature of the combination obtained in step b) to 25° C.;

d) adding $C_{12\text{-}14}AE_{1\text{-}3}S$, Na-DTPA (if any), Neodol®25-7, dodecyldimethyl amine oxide, $C_{12}$-$C_{18}$ fatty acid, 1,2 propanediol (if any), monoethanolamine (if any), calcium chloride (if any), sodium cumene sulphonate (if any), silicone emulsion (if any), sodium polyacrylate (if any), and Tinosan®HP100 into the batch container, mixing by applying a shear of 250 rpm until the combination is homogeneously mixed, and adjusting pH to 8;

e) adding brightener (if any), protease (if any), amylase (if any), dye (if any), and perfume oil (if any) into the batch container, mixing by applying a shear of 250 rpm, thus forming a liquid laundry detergent composition, wherein each ingredient in the composition is present in the level as specified for compositions A-F in Example 4.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process of removing microorganism from an article of clothing comprising the steps of:

a) providing an article of clothing in a washing machine; and b) contacting said article of clothing during a wash sub-cycle of said washing machine with a liquid detergent composition comprising from 15% to 60% by weight of the composition of a surfactant system comprising an anionic surfactant and a nonionic surfactant, from 7% to 40% by weight of the composition of an organic acid, wherein the organic acid comprises citric acid, and from 0.05% to 1% by weight of the composition of an anti-microbial agent, wherein the anti-microbial agent is 4-4'-dichloro-2-hydroxy diphenyl ether, and wherein the composition has a neat pH of from 1.5 to 3.5.

2. The process according to claim 1, wherein the composition has a neat pH of from 1.6 to 3.5.

3. The process according to claim 1, wherein through-the-wash (TTW) pH during the wash sub-cycle is from 2.5 to 6.0.

4. The process according to claim 1, wherein the composition comprises from 7% to 30% by weight of the composition of the organic acid.

5. The process according to claim 1, wherein the composition comprises from 15% to 50% by weight of the composition of the surfactant system.

6. The process according to claim 1, wherein the nonionic surfactant is selected from the group consisting of alkyl alkoxylated alcohols, alkyl alkoxylated phenols, alkyl polysaccharides, polyhydroxy fatty acid amides, alkoxylated fatty acid esters, sucrose esters, sorbitan esters and alkoxylated derivatives of sorbitan esters, and any combinations thereof;

wherein the ratio of anionic surfactant to nonionic surfactant is between 0.01 and 100.

7. The process according to claim 5, wherein the anionic surfactant is present as the main surfactant, preferably as the majority surfactant, in the composition.

8. The process according to claim 5, wherein the nonionic surfactant is present as the main surfactant in the composition, and the nonionic surfactant comprises $C_6$-$C_{20}$ alkoxylated alcohol.

9. The process according to claim 1, wherein the composition further comprises from 0.1% to 5% by weight of the composition of an amphoteric surfactant.

10. The process according to claim 1, wherein the composition further comprises from 0.1% to 10% by weight of the composition of a polyamine.

11. The process according to claim 1, wherein the composition further comprises from 0.1% to 5% by weight of the composition of a chelating agent.

12. The process according to claim 1, wherein the composition comprises:

1) from 15% to 30% by weight of the composition of the surfactant system comprising an anionic surfactant and a nonionic surfactant with a weight ratio of the anionic surfactant to the nonionic surfactant between 0.3 and 1.2 in which the nonionic surfactant comprises $C_{12}$-$C_{18}$ alkyl ethoxylate;
2) from 7% to 18% by weight of the composition of a citric acid; and
3) from 0.05% to 0.5% by weight of the composition, of 4-4'-dichloro-2-hydroxy diphenyl ether, wherein the composition has a neat pH of from 1.9 to 3.1.

13. The process according to claim 1, further comprising:

c) providing a rinse composition comprising from 10% to 40% by weight of the composition of an organic acid, wherein the rinse composition has a neat pH of from 1.5 to 4.0; and
d) contacting said article of clothing during a rinse sub-cycle of said washing machine with said rinse composition.

14. A process of removing biofilm from a biofilm-affected surface comprising contacting said biofilm-affected surface with a liquid detergent composition comprising from 15% to 60% by weight of the composition of a surfactant system comprising an anionic surfactant and a nonionic surfactant, from 10% to 40% by weight of the composition of an organic acid, wherein the organic acid comprises citric acid, and from 0.05% to 1% by weight of the composition of an anti-microbial agent, wherein the anti-microbial agent is 4-4'-dichloro-2-hydroxy diphenyl ether, and wherein the composition has a neat pH of from about 2.4 to 2.6.

* * * * *